Patented Oct. 24, 1950

2,527,425

UNITED STATES PATENT OFFICE 2,527,425

STILBENE DISULFONIC ACID PRODUCTS

Ernst Keller and Reinhard Zweidler, Basel, Switzerland, assignors to J. R. Geigy A. G., Basel, Switzerland, a Swiss firm No Drawing. Application October 18, 1948, Serial No. 55,233. In Switzerland October 31, 1947

4 Claims. (Cl. 260—507)

The present invention is concerned with the manufacture of brightening agents for animal and vegetable fibres having a more or less white to faintly yellowish appearance. The new brightening agents or optical bleaching agents are particularly suitable for adding to washing agents and rinsing liquors for vegetable fibres and have better properties than bleaching agents known so far, as hereinafter explained.

Compounds belonging to the most varied chemical types have already been suggested for use as optical bleaching agents, including, among others, derivatives of 4,4'-diaminostilbene some of which have attained considerable importance. Thus by reacting 4,4'-diaminostilbene-2,2'-disulphonic acid with 2 mols of cyanuric halide and replacing the remaining halogen atoms by amino radicals, optical bleaching agents are obtained distinguished by a blue fluorescence and pronounced substantive character which makes them very suitable for brightening cellulose fibres. Still more valuable products are obtained from the condensation products named above by treatment with formaldehyde. While these agents are very well suited for the finishing of bleached material made from cellulose fibres their use as additives to washing agents for ordinary domestic laundering and to rinsing-liquors has the disadvantage that they accumulate on the fibre because of their pronounced substantivity and wet-fastness. Consequently, after repeated treatment the material acquires an unpleasant violet to blue appearance owing to the very strong fluorescence of these compounds. Furthermore, they are little suited for treating wool, because of too low affinity. Suitable brightening agents for wool fibres are diacylated 4,4'-diaminostilbene-2,2'-disulphonic acids, for example, the diacetyl derivative, but this has the disadvantage of a reddish fluorescence and too small an affinity for cellulose fibres. Again, the dibenzoyl or di-(p-aminobenzoyl) derivatives although having affinity for the cellulose fibre also have unfortunately, a very poor solubility in water and bad light-fastness, especially the second derivative named. They readily precipitate from the liquor in which they are being used, causing a pronounced spotty white effect. Finally, the use of 4,4'-di-phenylureido-stilbene-2,2'-disulphonic acids has been recommended, but their reddish fluorescence is not satisfactory and their fastness to light is not all that could be desired.

The surprising discovery has now been made that 4,4'-diaminostilbene derivatives of the general formula

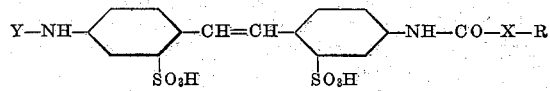

wherein

X means a direct carbon linkage or a divalent bridging member of the formula —O—, —NH— or —alkylene—O—, Y means the acyl radical of a lower aryloxy fatty acid and, R means an alkyl or aryl radical, which can be substituted as desired, excluding, however, the sulphonic acid group are distinguished by having good solubility in water, good affinity for the fibre, blue to greenish-blue fluorescence, better fastness to light and moderately good wet-fastness properties, so that they are suitable for brightening wool as well as cellulose fibres and are excellent for mixtures of both. Material brightened with these agents has a very fine white appearance and good wet-fastness properties towards careful soap-washing. However, they can be removed from the fibre to a large extent by a boiling soap-wash so that there is no danger of an unwished for accumulation on the fibre after repeated use. Consequently they are particularly suitable for adding to washing agents for domestic laundering and to rinsing liquors for white washing, especially since they also have good stability towards salts of inorganic peracids.

The new brightening agents are obtained either from a 4,4'-diaminostilbene-disulphonic acid monoacylated with an aryloxy fatty acid radical by further acylation with an acylating agent introducing the —R—X—CO— radical or from a 4,4'-diaminostilbene-disulphonic acid monoacylated by the R—X—CO— radical by further acylation with a reactive derivative of an aryloxy fatty acid. The monoacylated 4,4-diaminostilbene compounds of the invention are easily available by reduction of the nitro group of the corresponding 4-nitro-4'-acylaminostilbene compounds. As reactive derivatives of aryloxy fatty acids, whereby only the lower members are considered, there come into consideration, for example, their anhydrides or acid halides. Special mention should be made of the phenoxyacetyl and cresoxyacetyl derivatives, which are particularly suitable. As acylating agents for introducing the R—X—CO— radical there come into consideration:

(a) when X means a direct carbon linkage: anhydrides of lower fatty acids, such as, e. g., acetic anhydride and propionic anhydride or halides of these fatty acids such as, e. g., acetyl chloride, β-bromopropionyl chloride, butyryl chloride and iso-butyryl chloride; anhydrides or halides of aryl-substituted fatty acids, e. g., phenylacetyl chloride; arylcarboxylic acid halides, e. g., benzoyl chloride, p-chlorobenzoyl chloride, 2-naphthoyl chloride and 1-naphthoyl chloride;

(b) when X means oxygen: chloroformic acid esters, e. g., methyl, ethyl, isopropyl and phenylchloroformate;

(c) when X means the NH-group: aliphatic isocyanates, e. g., methylisocyanate or aromatic isocyanates, e. g., phenyl isocyanate, p-chlorophenyl isocyanate, p-nitrophenyl isocyanate, naphthyl isocyanate;

(d) when X means the —alkylene—O— group: alkoxy fatty acid anhydrides or halides, e. g., methoxyacetic anhydride, ethoxyacetic anhydride and butoxyacetyl chloride or aryloxy fatty acid halides or anhydrides, e. g., phenoxyacetic anhydride, phenoxyacetyl chloride, chlorophenyloxyacetyl chloride, naphthyl-2-oxyacetyl chloride, naphthyl-1-oxyacetyl chloride, chloronaphthyloxyacetyl chloride, α-phenoxy-propionyl chloride and β-phenoxypropionyl chloride, whereby, as already mentioned hereinbefore, phenyloxy derivatives of lower fatty acids are considered of particular value.

It is self-evident that if Y is identical with R—X—CO— then the monoacyl compound of the 4,4'-diaminostilbene derivative need not be specially prepared, since the latter compound can be twice acylated directly. Acylation can be carried out in an aqueous medium, or with good agitation, in a two phase system, for example, in a benzene-water mixture. In some cases it is advantageous to add an acid-binding agent, such as sodium acetate, sodium carbonate, calcium and magnesium carbonate or magnesium oxide.

When during the preparation of the new compounds radicals containing nitro groups are introduced on acylation with an aroylating agent, such nitro groups can be reduced if desired and the resulting amino groups then acylated.

The new brightening agents are characterised by containing at least one aryloxy fatty acid-acyl radical, while the second acyl group can be either the same as the first or greatly different. Besides the di-aryloxyacyl compounds, which are made particularly suitable by their beautiful greenish-blue fluorescence, those of the new compounds which contain an arylureido or urethane group as well as an aryloxyacylamino radical are especially valuable, since they are distinguished by possessing a beautiful blue fluorescence, good fastness to light and good drawing power on wool as well as on cellulose.

The new bleaching agents are pale yellow powders, soluble in water. In the form of their soluble salts they can be mixed dry with any desired washing agent, or an aqueous solution, containing also the components of the washing agent, can be made into a powder ready for use either by evaporation and milling or by spray-drying.

The following examples further illustrate and explain the manufacture and use of the new optical bleaching agents, without restricting the invention in any way. Parts are by weight, unless otherwise stated, and the temperatures in degrees centigrade.

*Example 1*

37 parts of 4,4'-diaminostilbene-2,2'-disulphonic acid are made into a neutral solution with 2000 parts of water and added in the presence of sodium acetate while stirring rapidly, to 42 parts of phenoxyacetyl chloride, dissolved in 250 parts of benzene. It is advantageous to neutralise the reaction mixture towards the end of the reaction by the addition of sodium carbonate or of caustic soda solution. On completion of acylation the reaction product is salted out and isolated. If necessary, it is dissolved in water and purified by treatment with such agents as will absorb or destroy any impurities present. When dried the sodium salt of 4,4'-diphenoxyacetaminostilbene-2,2'-disulphonic acid is a white powder. It is soluble in water and can be used in aqueous solution, with the addition of Glauber's salt, for brightening cellulose fibres such as cotton, staple fibre, linen and the like. Wool is also distinctly brightened when treated in a weakly acid bath. The brightened fibres have good fastness to light, acid and alkali. However, the wet-fastness properties on cellulose are usually very moderate so that it is always possible to remove the brightening agent, e. g., by normal domestic laundering.

*Example 2*

40 parts of 4-nitro-4'-aminostilbene-2,2'-disulphonic acid are acylated with 21 parts of phenoxyacetyl chloride, with the addition of an acid binding agent such as sodium acetate, preferably in a bezene-water mixture. The nitro compound is then reduced, e. g., with iron and hydrochloric acid by the Béchamp method, to give 4-amino-4'-phenoxyacetaminostilbene-2,2'-disulphonic acid. 51.4 parts of this amino compound are dissolved in 2000 parts of water, weakly acidified with acetic acid, and allowed to react, while stirring well, with 14.3 parts of phenyl isocyanate in 250 parts of benzene. The reaction product obtained is dissolved in hot water, filtered off from the small amount of diphenylurea formed as a by-product and, if necessary, further purified as explained in Example 1.

It is of course also possible to prepare 4 - phenylureido - 4' - phenoxyacetaminostilbene - 2,2' - disulphonic acid by first treating 4-nitro-4'-aminostilbene-2,2'-disulphonic acid with phenylisocyanate, then reducing and finally acylating with phenoxyacetyl chloride.

The sodium salt of the new compound is a white powder. It gives a very good brightening effect on cellulose fibres, with very good fastness to water, acid and light as well as a very fine shade which appears more bluish than that of the product described in Example 1. Since the product has only moderate fastness to washing, although possessing very good substantivity, it can be removed again by suitably strong laundering. At the same time it is distinguished by good fastness to perborate and is very suitable for addition to household washing agents or as a rinsing agent. It may also be used for brightening wool from a weakly acid bath and here again it shows a good lightening effect.

*Example 3*

51.4 parts of 4-amino-4'-phenoxyacetaminostilbene-2,2'-disulphonic acid prepared, e. g., as in Example 2 are treated in aqueous benzene solution with 26 parts of p-nitrophenoxyacetyl chloride. After the reaction is over the nitro compound is isolated and reduced with iron and hydrochloric acid to give 4'-(4''-aminophenoxyacetamino) - 4 - phenoxyacetaminostilbene - 2,2'-disulphonic acid.

66.3 parts of this amino compound are treated again preferably in a two-phase system, with 13.1 parts of ethyl chloroformate, the product separated and purified as required. It is a yellowish powder and can be used in aqueous solution for brightening textile fibres such as wool, cotton and staple fibre. On wool the effects obtained have very good fastness to light and washing as well as good fastness to acid and alkali. Because of its properties on cellulose fibres the product is very suitable as an additive for washing agents.

Instead of with 26 parts of p-nitrophenoxyacetyl chloride, 51.4 parts of 4-amino-4'-phenoxyacetaminostilbene-2,2'-disulphonic acid may be reacted with 20 parts of p-toluyl chloride in the two-phase system. The product thus obtained is an excellent brightening agent with very good fastness properties.

*Example 4*

40 parts of 4,4'-nitroaminostilbene-2,2'-disulphonic acid are treated in the two-phase system with 23 parts of 2,5-dichlorophenylisocyanate dissolved in benzene. The nitro group is then reduced with iron and hydrochloric acid and 56 parts of the 4-amino-4'-(2'',5''-dichlorophenylureido)-stilbene-2,2'-disulphonic acid thus obtained allowed to react with a benzene solution of 21 parts of phenoxyacetyl chloride. The purified product is a pale yellowish powder with useful brightening effects on wool and cellulose fibres. On wool in particular the wet-fastness properties and fastness to alkalis are very good.

*Example 5*

40 parts of 4,4'-nitroaminostilbene-2,2'-disulphonic acid are reacted, preferably as in Example 4, with 23 parts of 3,4-dichlorophenylisocyanate in the two-phase system and the nitro compound is reduced with iron and hydrochloric acid. 56 parts of the 4-amino-4'-(3'',4''-dichlorophenylureido)-stilbene-2,2'-disulphonic acid obtained are acylated with 29 parts of 3,4-dichlorophenoxyacetal chloride, isolated and purified, if necessary. When dry, this compound is a yellowish powder whose aqueous solution is suitable for brightening cotton, staple fibre and wool. Treated cellulose fibres have excellent fastness to washing as well as good fastness properties in general.

*Example 6*

51.4 parts of 4-amino-4'-phenoxyacetaminostilbene-2,2'-disulphonic acid as described in Example 2 are allowed to react in aqueous solution in the presence of sodium acetate with 13.1 parts of ethyl chloroformate. The urethane obtained is a light yellow powder which strongly brightens wool from a weakly acid bath and cellulose fibres from a neutral one. Products which behave similarly are obtained if instead of ethyl chloroformate the equivalent amount of methyl or isopropyl chloroformate is used. These compounds may also be built up in the reverse order by first reacting 4,4'-nitroaminostilbene-2,2' - disulphonic acid with the ester of chloroformic acid, reducing the urethane obtained to the amino compound and then acylating with phenoxyacetyl chloride.

*Example 7*

51.4 parts of 4-amino-4'-phenoxyacetaminostilbene-2,2'-disulphonic acid are allowed to react in aqueous benzene solution with 23 parts of the ethyl ester of phenylisocyanate-m-carboxylic acid. On separation of the diphenylurea-dicarboxylic acid ethyl ester and purification, if required, a yellowish substance is obtained which is a good brightening agent for wool and cellulose fibres of all kinds. On staple fibre the brightening effect has excellent fastness to acid and alkali, very good wet-fastness properties and good fastness to light. A strong brightening is also produced on wool which has the same valuable properties as on staple fibre.

*Example 8*

40 parts of 4,4'-nitroaminostilbene-2,2'-disulphonic acid are reacted in the two-phase system with a benzene solution of 19 parts phenyl chloroformate in the presence of sodium acetate, the nitro group is reduced with iron and hydrochloric acid and 49 parts of the 4-amino-4'-carbophenoxyaminostilbene-2,2'-disulphonic acid so obtained acylated with 21 parts of phenoxyacetyl chloride. The same compound is obtained if 51.4 parts of the 4-amino-4'-phenoxyacetaminostilbene-2,2'-disulphonic acid is again treated in the two-phase system with 19 parts of phenyl chloroformate. The product has a strong brightening effect on wool and cellulose fibres with very good fastness properties.

*Example 9*

40 parts of 4,4'-nitroaminostilbene-2,2'-disulphonic acid are allowed to react with 21.6 parts of p-nitrobenzoyl chloride and the reaction product reduced to the diamino compound with iron and hydrochloric acid. 48.9 parts of this compound, 4-amino-4'-(4''-aminobenzoyl)-aminostilbene-2,2'-disulphonic acid are acylated with 42 parts of phenoxyacetyl chloride, preferably in the two-phase system. The product when pure is a yellow powder suitable for the brightening of cellulose fibres and of wool.

It is of particular interest for use as an additive to soap powder and to other washing agents.

*Example 10*

0.01% to 0.1% of 4-phenoxyacetamino-4'-phenylureido-stilbene-2,2'-disulphonic acid is added to a washing agent consisting of:

50 parts of soap
16 parts of soda ash and
5 parts of water glass

Cotton fabric washed with this washing agent by ordinary domestic laundering methods has a very beautiful white appearance after rinsing and drying.

In the examples which follow are collected together a series of further compounds preparable according to the methods given in Examples 1–9. They all have similar valuable properties.

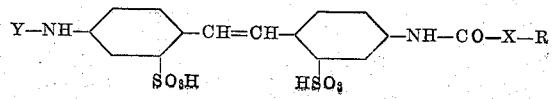

| No. | Y | —X—R |
|---|---|---|
| 11 | ⬡—O—CH₂—CO— | —CH₃ |
| 12 | CH₃—⬡—O—CH₂—CO— | —CH₃ |
| 13 | ⬡(OCH₃)—O—CH₂—CO— | —CH₃ |
| 14 | Cl—⬡—O—CH₂—CO— | —CH₃ |
| 15 | Cl—⬡(Cl)—O—CH₂—CO— | —CH₃ |
| 16 | CH₃—⬡—O—CH₂—CO—NH—⬡—O—CH₂—CO— | —CH₃ |
| 17 | Cl—⬡—O—CH₂—CO—NH—⬡—O—CH₂—CO— | —CH₃ |
| 18 | Cl—⬡—O—CH₂—CO— | CH₂—CH₃ |
| 19 | Cl—⬡—O—CH₂—CO— | CH₂—CH₂—CH₃ |
| 20 | Cl—⬡—O—CH₂—CO— | —CH(CH₃)₂ |
| 21 | ⬡—O—CH₂—CO— | —⬡ |
| 22 | ⬡—O—CH₂—CO— | —⬡—Cl |
| 23 | ⬡—O—CH₂—CO— | —⬡—NH—CO—CH₃ |
| 24 | ⬡—O—CH₂—CO— | —⬡—NH—CO—OC₂H₅ |
| 25 | ⬡—O—CH₂—CO— | —CH₂—⬡ |
| 26 | ⬡—O—CH₂—CO— | —⬡—NH—CO—CH₂—O—⬡ |
| 27 | ⬡—O—CH₂—CO— | —⬡—⬡ (naphthyl) |
| 28 | ⬡—O—CH₂—CO— | —⬡⬡ (naphthyl) |
| 29 | Cl—⬡—O—CH₂—CO— | —O—C₂H₅ |
| 30 | Cl—⬡(Cl)—O—CH₂—CO— | —O—C₂H₅ |
| 31 | ⬡—O—CH₂—CO—NH—⬡—O—CH₂—CO— | —O—C₂H₅ |
| 32 | CH₃—⬡—O—CH₂—CO—NH—⬡—O—CH₂—CO— | —O—C₂H₅ |

| No. | Y | —X—R |
|---|---|---|
| 33 | Cl-[C6H3(Cl)]-O-CH2-CO-NH-[C6H4]-O-CH2-CO- | —O—C2H5 |
| 34 | Cl-[C6H4]-O-CH2-CO-NH-[C6H4]-O-CH2-CO- | —O—C2H5 |
| 35 | C2H5—O—CO—NH-[C6H4]-O-CH2-CO- | —O—C2H5 |
| 36 | [C6H4](O-CH2-CO-)(NH-COO-[C6H5]) | —O-[C6H5] |
| 37 | Cl-[C6H4]-O-CH2-CO- | —NH—CH3 |
| 38 | CH3-[C6H4]-O-CH2-CO- | —NH—CH2—CH3 |
| 39 | [C6H5]-O-CH2-CH2-CO- | —NH-[C6H5] |
| 40 | [C6H5]-O-CH2-CO- | —NH-[C6H4]-Cl |
| 41 | CH3-[C6H4]-O-CH2-CO- | —NH-[C6H4]-Cl |
| 42 | CH3—O-[C6H4]-O-CH2-CO- | —NH-[C6H4]-Cl |
| 43 | Cl-[C6H4]-O-CH2-CO- | —NH-[C6H4]-Cl |
| 44 | Cl-[C6H3(Cl)]-O-CH2-CO- | —NH-[C6H4]-Cl |
| 45 | Cl-[C6H3(Cl)]-O-CH2-CO- | —NH-[C6H4]-Cl |
| 46 | [C6H5]-O-CH2-CO- | —NH-[C6H3(Cl)]-Cl |
| 47 | [C6H5]-O-CH2-CO- | —NH-[C6H4]-NH-CO-CH2-O-[C6H5] |
| 48 | [C6H5]-O-CH2-CO- | —NH-[C6H4]-NH-CO-CH2-O-[C6H5] |
| 49 | CH3—O-[C6H4]-O-CH2-CO- | —NH-[C6H4]-NH-CO-CH2-O-[C6H4]-OCH3 |
| 50 | [C6H5]-O-CH2-CO- | —NH-[naphthyl] |
| 51 | [C6H5]-O-CH2-CO- | —CH2—O—C4H9 |
| 52 | Cl-[C6H4]-O-CH2-CO- | —CH2—O—C4H9 |
| 53 | [naphthyl]-O-CH2-CO- | —CH2—O-[C6H5] |

| No. | Y | —X—R |
|---|---|---|
| 54 | ⬡—O—CH₂—CO— | —CH—O—⬡<br>    |<br>   CH₃ |
| 55 | ⬡—O—CH₂—CH₂—CO— | —CH₂—CH₂—O—⬡ |
| 56 | ⬡—O—CH₂—CO— | —CH₂—O—⬡—O—CH₂— |
| 57 | ⬡—O—CH₂—CO— | —CH₂—O—⬡—NH—CO—CH₂—O—⬡ |
| 58 | ⬡—O—CH₂—CO— | —CH₂—O—⬡—NH—CO—CH₂—O—⬡—CH₃ |
| 59 | ⬡—O—CH₂—CO— | —CH₂—O—⬡—NH—CO—CH₂—O—⬡(CH₃-O) |
| 60 | ⬡—O—CH₂—CO— | —CH₂—O—⬡—NH—CO—NH—⬡(CH₃, CH₃) |
| 61 | ⬡—O—CH₂—CH₂—CH₂—CO— | —CO—NH—⬡ |

What we claim is:

1. A brightening agent comprising a compound of the formula

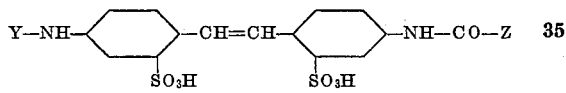

wherein Y stands for an acyl radical of an aryloxy substituted acetic acid of the benzene series, and Z stands for a member selected from the group consisting of lower alkyl, lower alkoxy, aryloxymethylene of the benzene series, arylamino of the benzene series and aryl of the benzene series, this compound containing not more than the two sulfonic acid groups indicated in the above formula.

2. A brightening agent comprising a compound of the formula

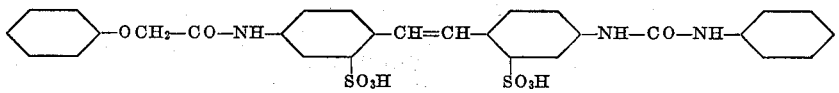

3. A brightening agent comprising a compound of the formula

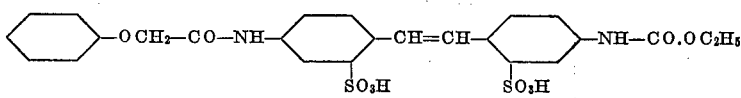

4. A brightening agent comprising a compound of the formula

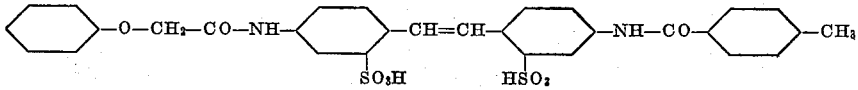

ERNST KELLER.
REINHARD ZWEIDLER.

REFERENCES CITED

The following references are of record in the file of this patent:

UNITED STATES PATENTS

| Number | Name | Date |
|---|---|---|
| 2,195,790 | Schmid | Apr. 2, 1940 |

FOREIGN PATENTS

| Number | Country | Date |
|---|---|---|
| 584,484 | Great Britain | Jan. 15, 1947 |

OTHER REFERENCES

Stobbe et al., Ber. V. 46 (1913), pages 1226–1238, 13 pages.